United States Patent
Yamada

(10) Patent No.: US 7,050,494 B1
(45) Date of Patent: May 23, 2006

(54) FRAME DISPLAY METHOD AND APPARATUS USING SINGLE FIELD DATA

(75) Inventor: Toru Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/325,705

(22) Filed: Jun. 4, 1999

(30) Foreign Application Priority Data

Jun. 4, 1998 (JP) .................... 10-156406

(51) Int. Cl.
*H04N 7/12* (2006.01)

(52) U.S. Cl. ............ 375/240.01; 375/240; 375/240.12; 375/240.24; 375/240.25

(58) Field of Classification Search ........... 375/240.18, 375/240.03, 240.13, 240.14, 240.01, 240.12, 375/240.16, 240, 240.24, 240.25; 382/238; 348/401, 459, 395.1
See application file for complete search history.

(56) References Cited

U.S. PATENT DOCUMENTS

| | | | | |
|---|---|---|---|---|
| 5,175,618 A | * | 12/1992 | Ueda et al. | 375/240.13 |
| 5,418,570 A | * | 5/1995 | Ueno et al. | 375/240.14 |
| 5,453,788 A | * | 9/1995 | Matsushima et al. | 348/395.1 |
| 5,485,279 A | * | 1/1996 | Yonemitsu et al. | 375/240.14 |
| 5,544,266 A | * | 8/1996 | Koppelmans et al. | 382/238 |
| 5,703,651 A | * | 12/1997 | Kim et al. | 375/240.13 |
| 5,872,600 A | * | 2/1999 | Suzuki | 348/459 |
| 6,081,295 A | * | 6/2000 | Adolph et al. | 375/240.03 |
| 6,104,753 A | * | 8/2000 | Kim et al. | 375/240.16 |

FOREIGN PATENT DOCUMENTS

| | | |
|---|---|---|
| JP | 8-294115 | 11/1996 |
| JP | 9-219838 | 8/1997 |
| JP | 10-32821 | 2/1998 |

\* cited by examiner

*Primary Examiner*—Allen Wong
(74) *Attorney, Agent, or Firm*—Foley & Lardner LLP

(57) ABSTRACT

The present invention relates to a method for displaying picture frames using single field data in interlaced encoded image data having a two-field structure. This method comprises the steps of: performing inverse quantization of the interlaced encoded image data to obtain DCT (Discrete Cosine Transform) coefficients of each of the field blocks; selecting one of two fields forming each picture frame; adding zero values after the DCT coefficients of each of field block in the selected field in order to obtain compensated DCT coefficients having a data size corresponding to one frame block; and performing inverse DCT of the compensated DCT coefficients to obtain image data for each frame block. According to this method, there is no time-lag between the odd and even numbered scanning lines in the reproduced picture frames, and the dynamic images are clear even if the motion of the images is fast.

10 Claims, 5 Drawing Sheets

FRAME DISPLAY METHOD AND APPARATUS USING SINGLE FIELD DATA

BACKGROUND OF THE INVENTION

1. Field of the Invention

The present invention relates to a technique for reproducing dynamic images from compression coded image data. In particular, the present invention relates to a method and apparatus for displaying picture frames using single field data contained in two-field image data, for example, in image data encoded by the MPEG-2 (Moving Picture Experts Group 2) standard.

2. Background Art

Scanning methods of dynamic images mainly consist of two types of methods, that is, sequential scanning and interlace scanning. In the sequential scanning method, data of all pixels in each frame are obtained at the same moment. In contrast, in the interlace scanning method, data of pixels in even-numbered and odd-numbered scanning lines in each frame are obtained at different moments. Compression of dynamic images according to the MPEG-2 (Moving Picture Experts Group 2) standard supports both the sequential scanning and the interlace scanning.

However, in the case where interlaced dynamic image data scanned by the MPEG-2 system is reproduced by a computer system, because the CRT display displays the interlace scanned dynamic images by sequential scanning, the dislocation of pictures in the two fields which form each frame deteriorates the quality of the dynamic image.

In order to prevent the deterioration of the quality of dynamic images in such a case, various techniques have been proposed for transforming interlacedly scanned dynamic data to dynamic image data suitable for the sequentially scanning display. For example, in the line interpolation method, data of one field is copied to the other field in the same frame, and each line in the first field is displayed twice in the manner of the sequential scanning. In the linear interpolation method, averages of each of the neighboring lines are taken, and each line in one of the fields and the averaged line are alternatively displayed in the manner of sequential scanning. In another method, after the mobility of the image between the two fields is calculated, the linear interpolation method is applied when the mobility is large, and the line interpolation method is applied when the mobility is small.

However, both the line interpolation method and the linear interpolation method have the drawback that the definition of dynamic images is reduced and images become indistinct. Furthermore, the third method requires high calculation speed for calculating the mobility of the image, and has the drawback of burdening the computer system.

SUMMARY OF THE INVENTION

It is therefore an object of the present invention to provide an apparatus and method in which it is possible to display with high quality, by the sequential scanning, the interlacedly scanned image data having two-field structure such as the MPEG-2 encoded image data.

In order to accomplish the above objective, the first aspect of the present invention is a method for displaying picture frames using single field data in interlaced encoded image data having a two-field structure, comprising the steps of: performing inverse quantization of the interlaced encoded image data to obtain DCT (Discrete Cosine Transform) coefficients for each field block (for example, 8×8 pixels); selecting one of two fields forming each picture frame; adding zero values after the DCT coefficients of each field block in the selected field in order to obtain compensated DCT coefficients having a data length corresponding to one frame block (for example, 8×16 pixels); and performing inverse DCT of the compensated DCT coefficients to obtain pixel data for each frame block. Each of the picture frames can be displayed by combining the frame block data.

According to the first aspect, zero values are added after the DCT coefficients of each field block in the selected field in order to obtain compensated DCT coefficients having a data length corresponding to one frame block, and the inverse DCT of the compensated DCT coefficients to obtain pixel data for each frame. Therefore, it is possible to display picture frames which are clearer than those obtained by only twice enlarging of the single field image. Furthermore, there is no time-lag between the odd and even numbered scanning lines in the reproduced frames, and the dynamic images reproduced by the present invention are clear even if the motion of the images is fast.

The present method may further comprise the steps of determining frames for which to perform motion compensative prediction; and performing the motion compensative prediction of the pixel data corresponding to the frames to be compensated.

The second aspect of the present invention is a method for displaying picture frames using image using MPEG-2 (Moving Picture Experts Group 2) encoded image data obtained from NTSC (National Television System Committee) television signals, comprising the steps of: performing inverse quantization of the interlaced encoded image data to obtain DCT (discrete cosine transform) coefficients for each field block; alternatively selecting one of odd and even fields forming each picture frame at 1/60 second intervals; adding zero values after the DCT coefficients of each field block in the selected field in order to obtain compensated DCT coefficients having a data size corresponding to one frame block; and performing inverse DCT of the compensated DCT coefficients to obtain pixel data for each frame block.

In this case, it is possible to display dynamic images having 60 picture frames in one second by sequential scanning, while reproducing dynamic images from MPEG-2 encoded image data having 30 interlaced frames (=60 fields) in one second. Therefore, it is possible to display the NTSC dynamic image data with high quality.

This method may further comprise the steps of determining frames for which to perform motion compensative prediction; and performing the motion compensative prediction of the pixel data corresponding to the frames to be compensated. For example, in the case of operation for MPEG-2 encoded data, it is determined whether or not the reproduced frame is a P-picture or B-picture, and if the reproduced frame is not a P-picture or B-picture, but is an I-picture, which is not compressed by the motion compensative prediction, the frame data is displayed. However, when the reproduced frame is a P-picture or B-picture, the frame data is further decoded by the motion compensative prediction according to the MPEG-2 standards in order to reproduce the original frame data, and the decoded frame data is displayed.

The third aspect of the present invention is an apparatus for displaying picture frames using single field data in interlaced encoded image data having a two-field structure. This apparatus comprises: a compressed data buffer for loading and temporarily storing at least a part of the encoded image data; an inverse quantizer for obtaining DCT coefficients for each block from the encoded image data stored in the compressed data buffer; a selecting device for selecting one of two fields forming each picture frame; a DCT coefficient addition device for adding zero values after the DCT coefficients of the selected field in order to obtain compensated DCT coefficients having a data length corresponding to one frame; and an inverse DCT processing device for performing inverse DCT of the compensated DCT coefficients to obtain pixel data in each frame.

According to this apparatus, it is possible to display the picture frames which are clearer than those obtained by only twice enlarging of the single field image as explained regarding the first aspect of the present invention. Furthermore, there is no time-lag between the odd and even numbered scanning lines in the reproduced picture frames, and the dynamic images are clear even if the motion of the images is fast.

This apparatus may further comprise a device for determining frames to perform motion compensative prediction and a device for performing the motion compensative prediction of the pixel data corresponding to the frames to be compensated.

Additionally, this apparatus may further comprise a storage device for storing the encoded image data to be displayed and a display device such as a CRT, for displaying the picture frames.

DETAILED DESCRIPTION OF THE PREFERRED EMBODIMENTS

Referring to FIGS. 1 to 6, the best modes of the frame display method and apparatus according to the present invention will be explained.

FIRST EMBODIMENT

Figure 1:
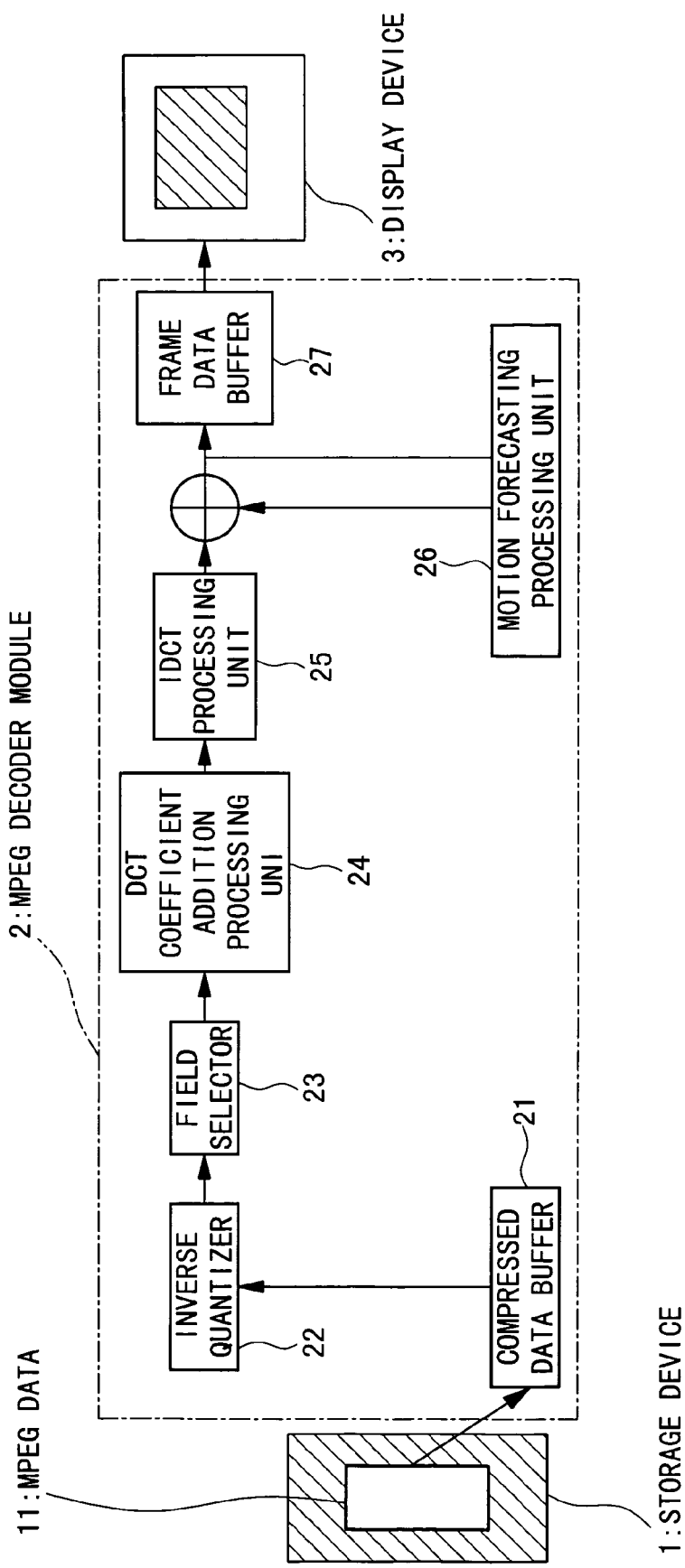
FIG. 1 is a block diagram of a frame display apparatus according to the first embodiment of the present invention.

FIG. 1 is a block diagram illustrating the frame display apparatus of the first embodiment of the present invention. This apparatus comprises a storage device 1 for storing compressed image data, an MPEG decoder module 2 for decoding the compressed image data according to a program, and a display device 3 for displaying the decoded image data. In this embodiment, the storage device 1 stores encoded image data 11 having two-field structure, such as MPEG-2 encoded dynamic image data. The storage device 1 may be any conventional storage device such as a hard disk drive, a CD-ROM drive, a DVD-ROM drive, or a magnetic recorder. The MPEG decoder module 2 may be constructed in a computer system (not shown), and all devices thereof may be controlled by a CPU (not shown).

The MPEG decoder module 2 comprises a compressed data buffer 21 for temporarily storing a part of the compressed image data 11, an inverse quantizer 22 for performing inverse quantization of the quantized image data stored in the data buffer 21, a field selector 23 for selecting one of two fields forming each picture frame, a DCT coefficient addition processing unit 24 for adding zero values after the DCT coefficients of each field block in the selected field in order to obtain compensated DCT coefficients having a data length corresponding to one frame block, a IDCT processing unit 25 for performing inverse DCT of the compensated DCT coefficients to obtain frame block data in each frame to be displayed, a motion forecasting processing unit 26 for performing the motion compensative prediction of the pixel data corresponding to the frames to be compensated, and a frame data buffer 27 for temporarily storing the decoded image data to be displayed. The display device 3 displays the decoded image data stored in the frame data buffer 27 in the manner of sequential scanning.

In the present embodiment, first, a part of the MPEG encoded image data 11 stored in the storage device 1 is read out and transmitted to the compressed data buffer 21. Because the encoded image data 11 has a two-field structure and has been quantized according to the MPEG-2 standard, the inverse quantizer 22 performs inverse quantization of the quantized image data stored in the data buffer 21, and reproduces DCT coefficients for each field block which consists of 8×8 pixels in this case. Each field block may consist of a different number of pixels, if necessary.

Figure 2:
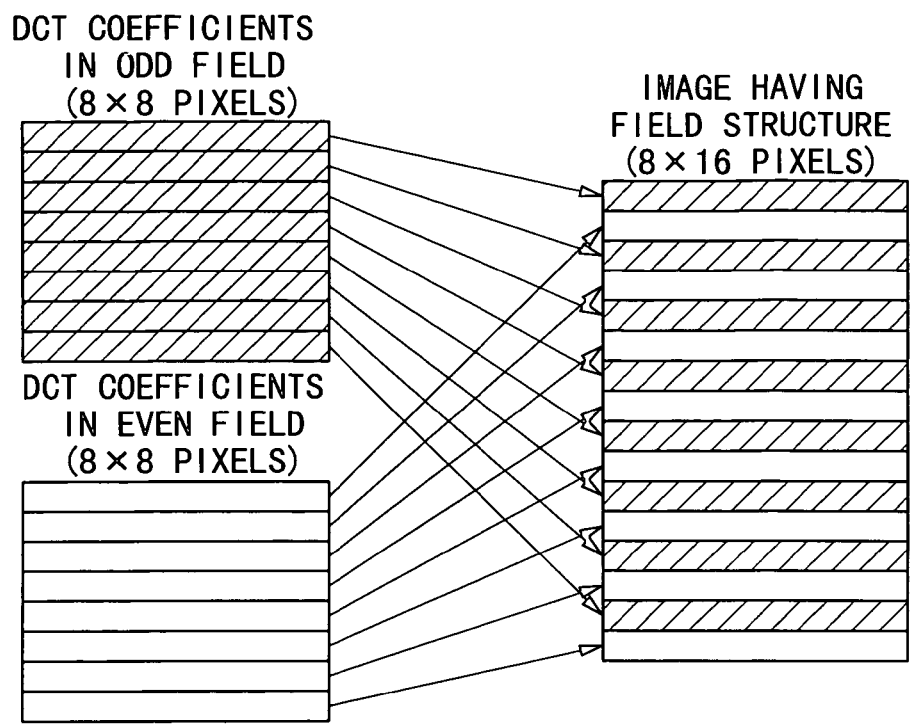
FIG. 2 is a schematic diagram illustrating image data having two-field structure.

The dynamic image data which will be reproduced from the encoded image data 11 consists of a plurality of frames, and each of the frames consists of two fields, that is, odd field and even field, and each of the fields is divided into a plurality of field blocks consisting of 8×8 pixels, as shown in FIG. 2. In the conventional frame display method using the sequential scanning, the pixel data decoded from the DCT coefficients of the odd and even fields are arranged alternately as each of the scanning lines to form an image as shown in FIG. 2. However, because there is a time-lag of ⅟60 second between the odd and even fields, in the case where the motion of the images is large and the images are displayed by sequential scanning, the quality of images will be lowered and the images become indistinct.

Figure 3:
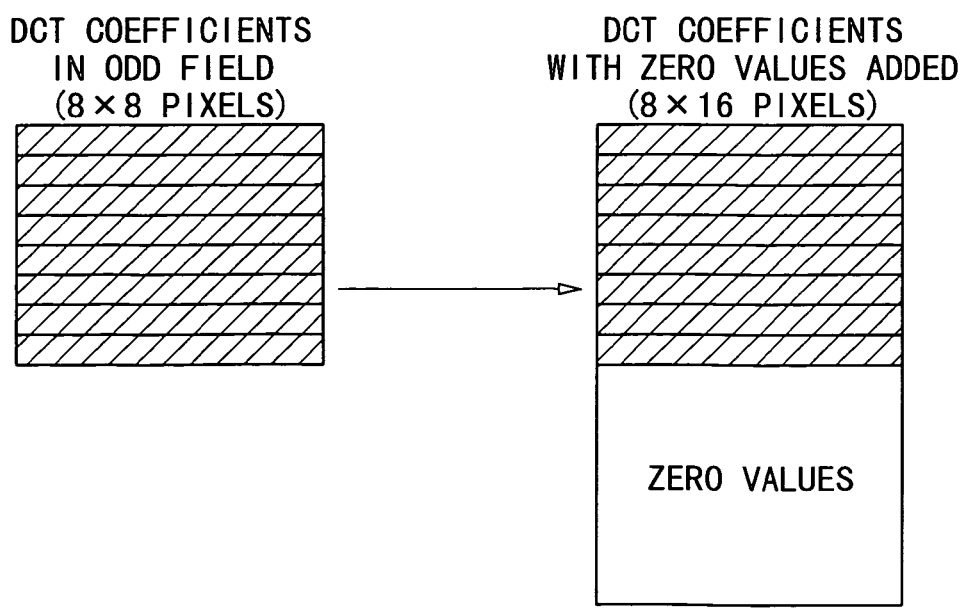
FIG. 3 is a schematic diagram illustrating addition of zero values after DCT coefficients of a single field.

In order to prevent such deterioration of the image quality, the present invention is characterized in reproducing each frame data using only one of the two field data forming each frame. First, one of the two field data is selected, and the DCT coefficients of each field block (for example, 8×8 pixels) in the selected field are calculated. Next, as shown in FIG. 3, zero values are added after the calculated DCT coefficients of each field block to obtain compensated DCT coefficients having a data length corresponding to one frame block (for example, 8×16 pixels). If zero values are not added after the DCT coefficients, the image data which can be obtained by the IDCT (Inverse Discrete Cosine Transform) of the DCT coefficients will become half the size of the original image. By adding zero values after the DCT coefficient to double the size thereof, it becomes possible to reproduce image data having the same size as the original image by performing the IDCT. In general, the DCT coefficients have large values in the low frequency region thereof, and the values of the higher frequency region in the DCT coefficients will become zero values after performing the quantization of the DCT coefficients. Therefore, the doubling of the DCT coefficients by addition of zero values does not lead to an increase of the computation load.

By performing the IDCT of the compensated DCT coefficients, the pixels in the reproduced picture frame image are smoothly arranged between the neighboring scanning lines, it is therefore possible to display the images which are clearer than those obtained by only twice enlarging of the single field image. Furthermore, there is no time-lag between the odd and even numbered scanning lines, and the dynamic images reproduced by the present method are clear even if the motion of the images is large or fast.

Figure 4:
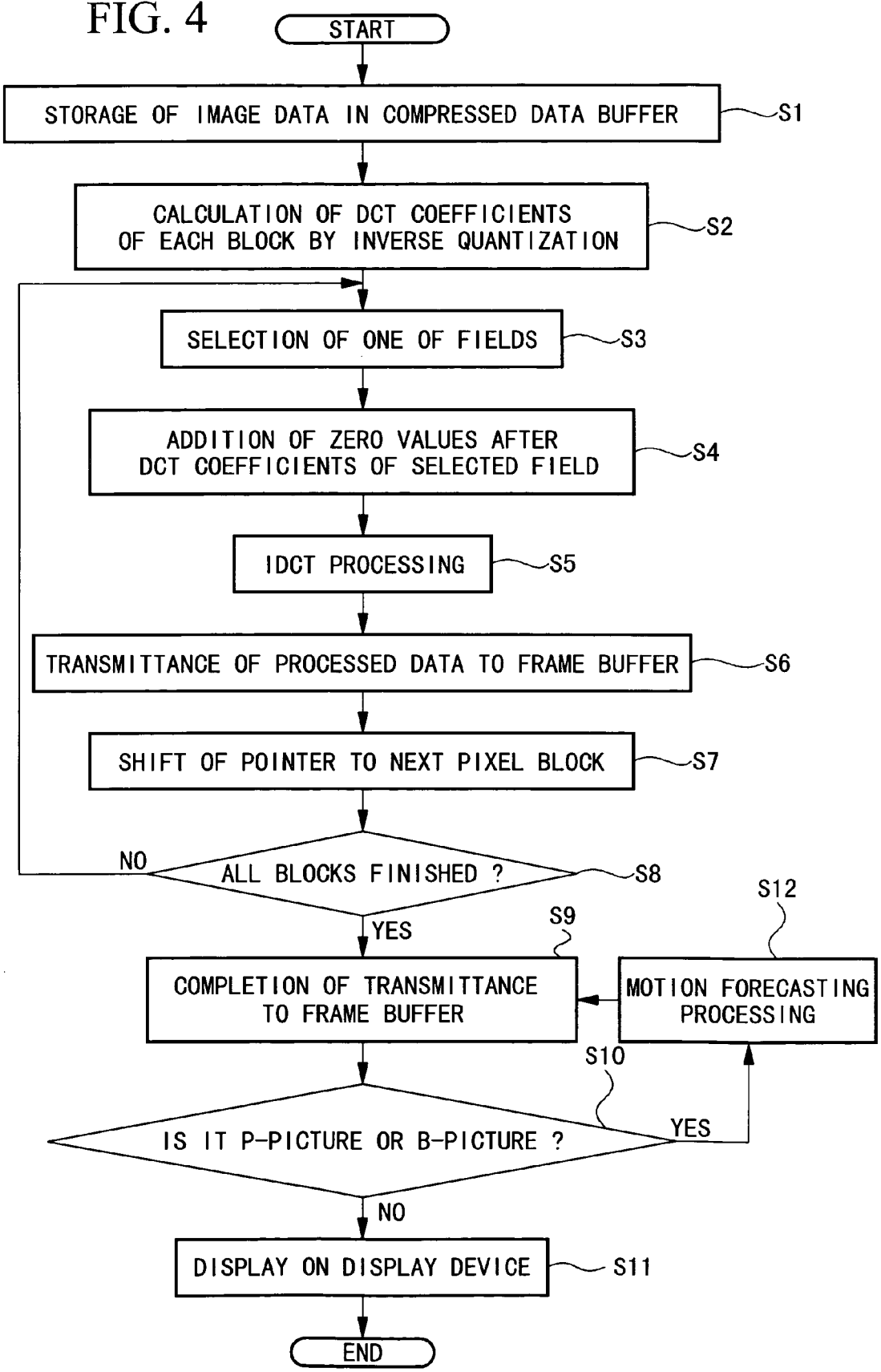
FIG. 4 is a flowchart illustrating the frame display method according to the first embodiment of the present invention.

FIG. 4 is a flowchart illustrating the steps of the frame display method by the first embodiment shown in FIG. 1. In the step S1, a part of the compressed image data 11 is transmitted to the compressed data buffer 21. Since the compressed image data 11 has been quantized by the MPEG-2 standard, in the step S2, the inverse quantizer 22 performs the inverse quantization of the compressed image data 11 stored in the data buffer 21 to obtain the DCT coefficients. The DCT coefficients are the values obtained by performing the DCT of the pixel data contained in each field block, and the field block is, in this embodiment, a region consisting of 8×8 pixels in each of the two fields forming one frame. The number of the pixels in one field block may be changed, if necessary. The odd fields and the even fields respectively contain image data recorded at different times from each other.

In the step S3, the field selector 23 selects one of the two fields, and, in the step 4, as shown in FIG. 3, the DCT coefficient addition processing unit 24 adds a necessary number of zero values after the DCT coefficients of each field block in the selected field in order to obtain the compensated DCT coefficients having a data length corresponding to one frame block size, which is 8×16 pixels in this case. By this operation, the high frequency region of the compensated DCT coefficients is occupied by the added zero values.

In the step S5, the IDCT processing unit 25 performs the IDCT of the compensated DCT coefficients to reproduce frame block data, which has 8×16 pixels in this case. In the step S6, the obtained frame block data is transmitted to the frame data buffer 27, and in the step S7, the pointers are shifted to the next field block in the selected fields. In the step S8, it is determined whether or not all the field blocks in the selected field are finished, and if not, the steps S3–S7 are repeated. In the case of the completion of the operation for all blocks, the process goes to the step S9.

In the next step S10, it is determined whether or not the reproduced frame data stored in the frame data buffer 27 is compressed by the motion compensative prediction, that is, whether or not the reproduced frame is a P-picture or B-picture. A P-picture is a frame data compressed by the forward prediction, and a B-picture is a frame data compressed by the bidirectional prediction. If the reproduced frame is not a P-picture or a B-picture but is an I-picture which is not compressed by the motion compensative prediction, the process goes to the step S11, and the frame data is displayed on the display device 3. When the reproduced frame is the P-picture or B-picture, the process goes to the step S12, and the motion forecasting processing unit 26 decodes the frame data according to the motion compensative prediction in the MPEG-2 standards in order to reproduce the original frame data. The reproduced original frame data is stored again in the frame buffer 27, and the decoded frame data is displayed on the display device 3. Furthermore, the steps S1–S11 will be repeated until all the MPEG-2 encoded data is displayed.

Because the B-picture is encoded using the neighboring I-picture and/or P-picture, in the case where the I-pictures and the P-pictures are displayed according to the method of the present invention using the single field data, the quality of the B-pictures may be lowered. For such a case, it is also possible to apply the present invention to only the display of the B-pictures so that the degradation of the quality of the B-pictures can be reduced.

SECOND EMBODIMENT

The second embodiment of the present invention will be explained referring to FIGS. 5 and 6. This embodiment displays, on a display device such as a CRT, dynamic images having 60 frames per second by sequential scanning, from MPEG-2 encoded image data having 30 interlaced frames (=60 fields) per second. This embodiment is suitable to the NTSC (National Television System Committee) system which uses, as a standard, the interlace scanning method in which 30 frames (60 fields) are reproduced per second.

Figure 5:
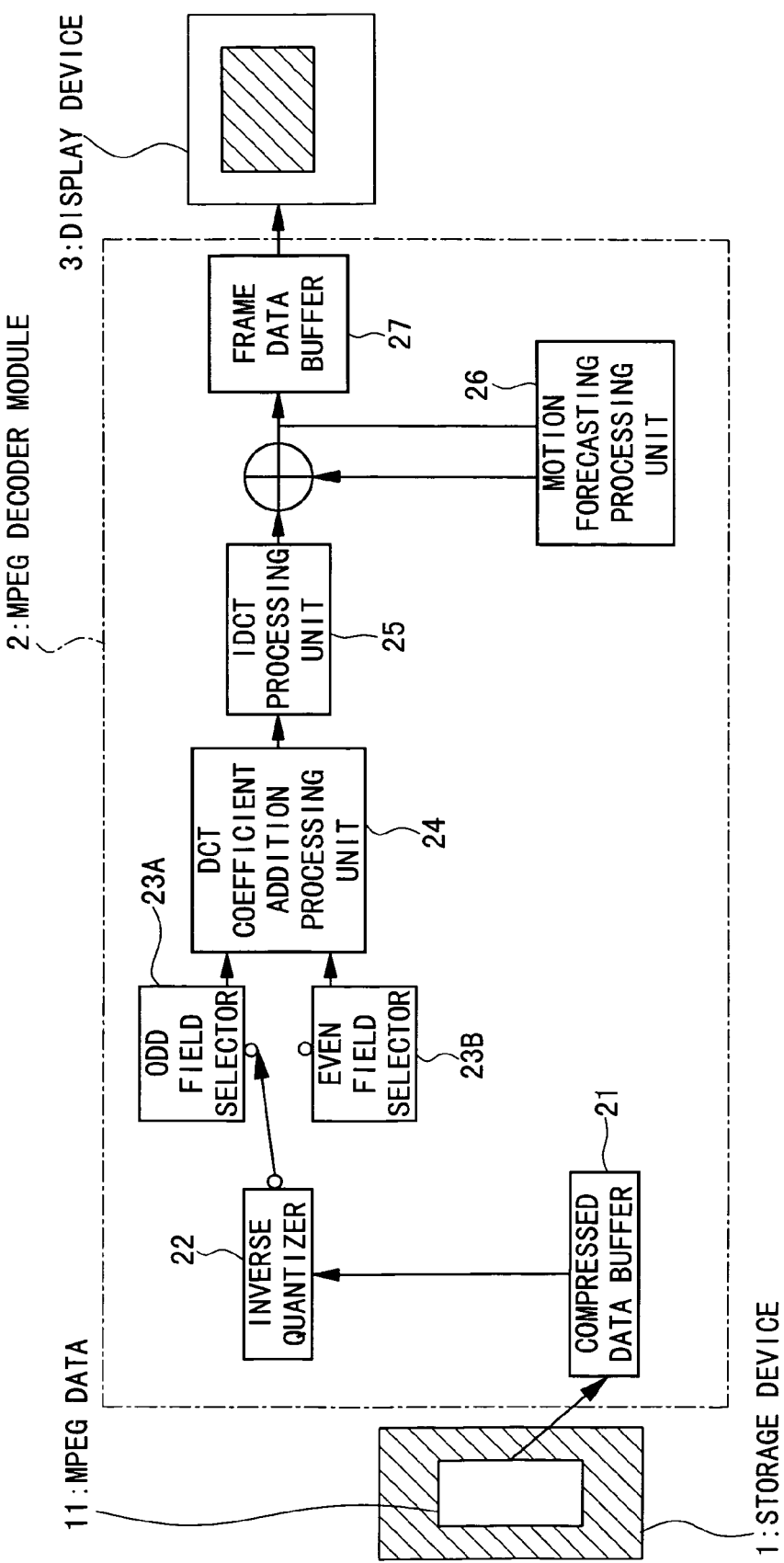
FIG. 5 is a block diagram of the frame display apparatus according to the second embodiment of the present invention.

FIG. 5 is a block diagram of the hardware of the second embodiment, and in this embodiment, an odd field selector 23A and an even field selector 23B are provided in place of the field selector 23 in the first embodiment. The odd and even field selectors 23A and 23B respectively extract the odd and even field data from each of the frame data, in an alternative manner at intervals of $1/60$ second. Other features are substantially the same as those of the first embodiment.

Figure 6:
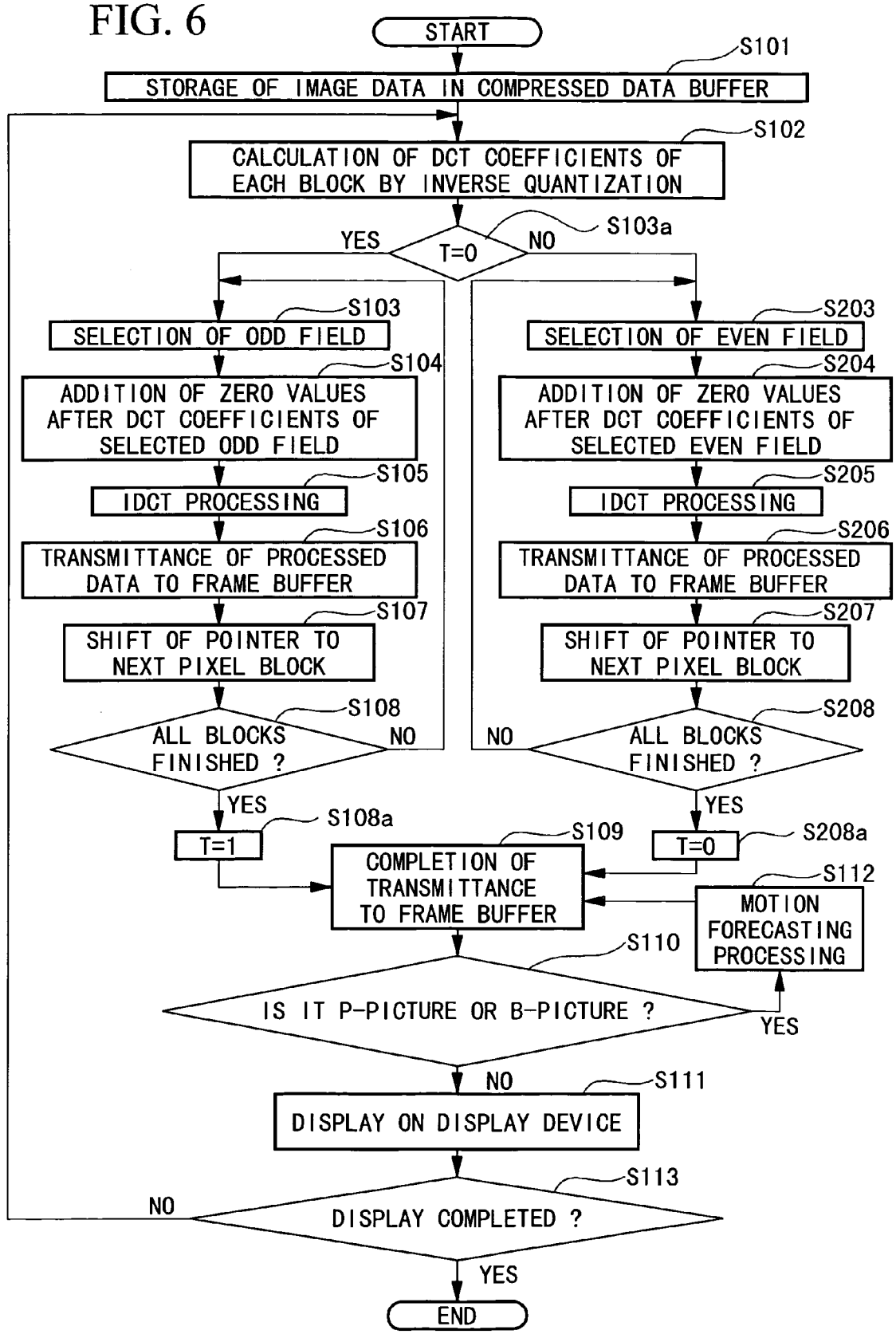
FIG. 6 is a flowchart illustrating the frame display method according to the second embodiment of the present invention.

FIG. 6 is a flowchart illustrating the steps of the frame display method by the second embodiment shown in FIG. 5. In the step S101, the MPEG-2 encoded image data 11 stored in the storage device 1 is transmitted to the compressed data buffer 21. Since the compressed image data 11 has also been quantized by the MPEG-2 standard, in the step S102, the inverse quantizer 22 performs the inverse quantization of the compressed image data 11 stored in the data buffer 21 to obtain the DCT coefficients of each of all the field blocks in the two fields. In the second embodiment, each field block is a region consisting of 8×8 pixels in each of the two fields forming one frame, however, the number of the pixels in one field block may be changed if necessary.

In the step S103a, it is determined whether a timing variable T is "0" or "1", when the variable T is "0", the process goes to the step S103, and when the variable T is "1", the process goes to the step S203. According to the timing variable T, the odd and even field selectors 23A and 23B respectively extract the odd and even field data in an alternative manner at intervals of $1/60$ second.

In the step S103, the odd field selector 23A extracts DCT coefficients (in this case, 8×8 pieces) corresponding to one field block in the odd field, and in the step 104, as shown in FIG. 3, the DCT coefficient addition processing unit 24 adds a necessary number of zero values after the DCT coefficients of each field block in the odd field in order to obtain the compensated DCT coefficients having a data length (in this case, 8×16 pieces) corresponding to one frame block, which is 8×16 pixels in this case. By this operation, the high frequency region of the compensated DCT coefficients is occupied by the added zero values.

In the step S105, the IDCT processing unit 25 performs the IDCT of the compensated DCT coefficients to reproduce frame block, which has 8×16 pixels in this case. In the step S106, the obtained frame block is transmitted to the frame data buffer 27, and in the step S107, the pointer is shifted to the next field block in the same odd field. In the step S108, it is determined whether or not the operation of all the field blocks in the odd field are finished, and if not, the steps S103–S107 are repeated. In the case where the operation of all the field blocks is finished, the process goes to the step S108a, and the value "1" is input to the timing variable T. Furthermore, the process goes to the step S109, and the storage of one full frame data in the frame data buffer 27 is completed.

On the other hand, when the process goes to the step S203, the even field selector 23B extracts DCT coefficients (in this case, 8×8 pieces) corresponding to one field block in the even field data, and in the step 204, the DCT coefficient addition processing unit 24 adds a necessary number of zero values after the DCT coefficients of each field block in the selected field in order to obtain the compensated DCT coefficients having a data length (in this case, 8×16 pieces) corresponding to one frame block size, which is 8×16 pixels in this case.

In the step S205, the IDCT processing unit 25 performs the IDCT of the compensated DCT coefficients to reproduce frame block data, which has 8×16 pixels in this case. In the step S206, the obtained frame block data is transmitted to the frame data buffer 27, and in the step S207, the pointer is shifted to the next field block in the same even field. In the step S208, it is determined whether or not the operation of all the field blocks in the even field are finished, and if not, the steps S203–S207 are repeated. In the case where the operation of all the field blocks is finished, the process goes to the step S208a, and the value "0" is input to the timing variable T. Furthermore, the process goes to the step S109, and the storage of one full frame data in the frame data buffer 27 is completed.

In the next step S110, it is determined whether or not the frame data stored in the frame data buffer 27 is compressed by the motion compensative prediction, that is, whether or not the reproduced frame is a P-picture or B-picture. A P-picture is a frame data compressed by the forward prediction, and a B-picture is a frame data compressed by the bidirectional prediction. If the reproduced frame is not a P-picture or B-picture but is an I-picture which is not compressed by the motion compensative prediction, the process goes to the step S111, and the frame data is displayed on the display device 3. When the reproduced frame is a P-picture or B-picture, the process goes to the step S112, and the motion forecasting processing unit 26 decodes the frame data according to the motion compensative prediction in the MPEG-2 standards in order to reproduce the original frame data. The reproduced original frame data is stored again in the frame buffer 27, and the decoded frame data is displayed on the display device 3. In the step S113, it is determined whether or not all the MPEG-2 encoded data stored in the storage device 1 is displayed, and the steps S101–S111 will be repeated until the display of all the MPEG-2 encoded data is completed. Thus, this embodiment displays, on a display device 3, dynamic images having 60 frames per second by sequential scanning, while reproducing each picture frame from each field data in the MPEG-2 encoded image data having 30 interlaced frames (=60 fields) per second, therefore, it is possible to display NTSC dynamic image data with high quality.

Similar to the first embodiment, also in the second embodiment, because the B-picture is encoded using the neighboring I-picture and/or P-picture, in the case where the I-pictures and the P-pictures are displayed according to the method of the present invention using the single field data, the quality of the B-pictures may be lowered. For such a case, it is also possible to apply the present invention to only the display of the B-pictures so that the degradation of the image quality of the B-pictures can be reduced.

Although two embodiments of the present invention were described above, the present invention is not limited to these embodiments. For example, any features in the two embodiments can be combined with each other, or, any conventional arts can be applied to these embodiments.

What is claimed is:

1. A method for displaying frames of a dynamic image using single field data from an interlaced encoded image data having a two-field structure, comprising the steps of:
    performing inverse quantization of the interlaced encoded image data to obtain DCT (Discrete Cosine Transform) coefficients of each of a plurality of field blocks that comprise a frame;
    to half the size of the DCT coefficients and for each frame, selecting only one, but not both, of two fields that form the frame and discarding the non-selected field, each selected field consisting of selected field blocks;
    doubling the size of the DCT coefficients of each selected field block in each selected field by adding high frequency components in order to obtain compensated DCT coefficients having a data size corresponding to a frame block;
    performing inverse DCT of the compensated DCT coefficients to obtain image data corresponding to said frame block; and
    displaying the image data.

2. The method for displaying picture frames according to claim 1, further comprising the steps of:
    identifying frames for which to perform a motion compensative prediction; and
    performing the motion compensative prediction on the image data corresponding to the frames identified in the identifying step before displaying the image data in the displaying step.

3. The method for displaying frames according to claim 1, further comprising the steps of temporarily storing the interlaced encoded image data in a data buffer, wherein the interlaced encoded image data stored in the data buffer is subjected to inverse quantization.

4. A method for displaying frames according to claim 1, wherein the added high frequency components are zero values that are added to the calculated DCT coefficients of each field block to double the size thereof and also to reproduce image data having the same size as the original image.

5. A method for displaying frames of a dynamic image using MPEG-2 (Moving Picture Experts Group 2) encoded image data obtained from NTSC (National Television System Committee) television signals, comprising the steps of:
    performing inverse quantization of the MPEG-2 encoded image data to obtain DCT (discrete cosine transform) coefficients for each of a plurality of field blocks;
    alternatively selecting only one, but not both, of an odd field and an even field that form each frame at 1/60 second intervals and discarding the non-selected field, each of the selected odd field and the even field consisting of some of the plurality of field blocks;
    adding zero values after the DCT coefficients of each of the plurality of field blocks in the selected field in order to obtain compensated DCT coefficients having a data size corresponding to a frame block;
    performing inverse DCT of the compensated DCT coefficients to obtain pixel data for the frame block; and
    displaying the pixel data.

6. The method for displaying frames of a dynamic image according to claim 5, further comprising the steps of:
    identifying frames for which to perform a motion compensative prediction; and performing the motion compensative prediction of the pixel data corresponding to the frames identified in the identifying step before displaying the pixel data in the displaying step.

7. The method for displaying frames according to claim 5, further comprising the steps of temporarily storing the MPEG-2 encoded image data in a data buffer, wherein the MPEG-2 encoded image data stored in the data buffer is subjected to inverse quantization.

8. An apparatus for displaying frames of a dynamic image using single field data from interlaced encoded image data having a two-field structure, comprising:
   a compressed data buffer for loading and temporarily storing at least a part of the encoded image data representing a single frame;
   an inverse quantizer for obtaining DCT (Discrete Cosine Transform) coefficients for each of a plurality of field blocks from the encoded image data stored in the compressed data buffer;
   a selecting device that selects, to half the size of the DCT coefficients, only one of two fields, but not both, forming each picture frame and discards the non-selected field, each selected field consisting of some of the plurality of field blocks;
   a DCT coefficient addition device that doubles the size of the DCT coefficients of each field block in the selected field in order to obtain compensated DCT coefficients having a data length corresponding to a frame block;
   an inverse DCT processing device that performs inverse DCT of the compensated DCT coefficients to obtain pixel data for each frame block;
   a frame data buffer that temporarily stores the pixel data of the frame blocks; and
   a display device that displays the pixel data.

9. The apparatus for displaying frames according to claim 8, further comprising:
   an identifying device that identifies frames for which to perform motion compensative prediction, and
   a device that performs the motion compensative prediction of the pixel data corresponding to the frames identified by the identifying device before the display device displays the pixel data.

10. The apparatus for displaying frames according to claim 8, further comprising a storage device that stores the encoded image data to be displayed.

* * * * *